United States Patent
Kitahara et al.

[11] Patent Number: 6,081,223
[45] Date of Patent: Jun. 27, 2000

[54] VEHICLE ON WHICH MILLIMETER WAVE RADAR IS MOUNTED

[75] Inventors: Yasuo Kitahara, Hiratsuka; Taku Murakami, Yamato; Kunihiro Yamasaki, Isehara, all of Japan

[73] Assignee: Komatsu Ltd., Tokyo, Japan

[21] Appl. No.: 09/308,024

[22] PCT Filed: Nov. 11, 1997

[86] PCT No.: PCT/JP97/04089

§ 371 Date: May 11, 1999

§ 102(e) Date: May 11, 1999

[87] PCT Pub. No.: WO98/21604

PCT Pub. Date: May 22, 1998

[30] Foreign Application Priority Data

Nov. 13, 1996 [JP] Japan .................................. 8-315687
Nov. 13, 1996 [JP] Japan .................................. 8-315688

[51] Int. Cl.[7] .................................................. G01S 13/93
[52] U.S. Cl. .............................. 342/70; 342/71; 342/72; 342/109; 342/125; 340/436
[58] Field of Search ................................. 342/70, 71, 72, 342/109, 114, 115, 125; 340/904, 435, 436, 437

[56] References Cited

U.S. PATENT DOCUMENTS

| | | | |
|---|---|---|---|
| 3,781,879 | 12/1973 | Staras et al. | 342/159 |
| 3,952,301 | 4/1976 | Sorkin | 342/71 |
| 4,069,888 | 1/1978 | Wolters et al. | 180/169 |
| 4,151,526 | 4/1979 | Hinachi et al. | 342/59 |
| 4,210,357 | 7/1980 | Adachi | 342/70 |
| 5,774,045 | 6/1998 | Helma | 340/436 |
| 5,920,280 | 7/1999 | Okada et al. | 342/109 |

FOREIGN PATENT DOCUMENTS

| | | | |
|---|---|---|---|
| 362184381A | 8/1987 | Japan | G01S 17/88 |
| 2-212791 | 8/1990 | Japan . | |
| 2-212792 | 8/1990 | Japan . | |
| 4-305708 | 10/1992 | Japan . | |
| 5-113822 | 5/1993 | Japan . | |
| 405264730A | 10/1993 | Japan | G01S 13/93 |
| 6-68398 | 3/1994 | Japan . | |
| 6-174846 | 6/1994 | Japan . | |
| 08068858A | 3/1996 | Japan | B60R 21/00 |
| 08132930A | 5/1996 | Japan | B60K 41/20 |

*Primary Examiner*—John B. Sotomayor
*Attorney, Agent, or Firm*—Sidley & Austin

[57] ABSTRACT

The present invention relates to a vehicle with a millimeter wave radar by which not only a distance and a relative velocity can be measured but also traffic information of other various kinds can be obtained. A reflector (4a) which is installed at a predetermined position (5) near a road along which the vehicle (1) is traveling and changes the reflection intensity of a reflected wave (3b) every predetermined period of time to indicate a road state (X) near the predetermined position (5) and traffic information with the change (N1), a memory unit (6) which is mounted on the vehicle (1) and in which the change (N1) and an operation command (S1) of the vehicle (1) based upon the change (N1) are stored beforehand, being made to correspond to each other, and a control unit (8) which is mounted on the vehicle (1), reads the operation command (S1) corresponding to the change (N1) detected by the millimeter wave radar from the memory unit (6) and supplies the read operation command (S1) to a vehicle operating means (7) of the vehicle (1) to operate the vehicle (1) are provided.

5 Claims, 11 Drawing Sheets

PRIOR ART

VEHICLE ON WHICH MILLIMETER WAVE RADAR IS MOUNTED

TECHNICAL FIELD

The present invention relates to a vehicle on which a millimeter wave radar is mounted.

BACKGROUND ART

Recently, attempts to mount an object detector such as an ultrasonic sensor, a laser radar, an infrared radar, a picture sensor, an electric wave radar, or the like on a vehicle have been made in order to prevent accidents in expressways. However, the ultrasonic radar is influenced by noise, the laser radar or infrared radar is influenced by weather (rain, fog, or snow) or by dust, and the picture sensor is influenced by weather and dust and further has a disadvantage of complicated processing technology or the like, so that they lack in practical use. Contrary to the above, the electric wave radar does not tend to be influenced by weather, and therefore is frequently used for vessels or airplanes. When the electric wave radar is mounted on a vehicle, however, a satisfactory electric wave radar actually can not be obtained, since the electric wave radar accepts clutters from a road surface or surrounding objects.

Figure 21:
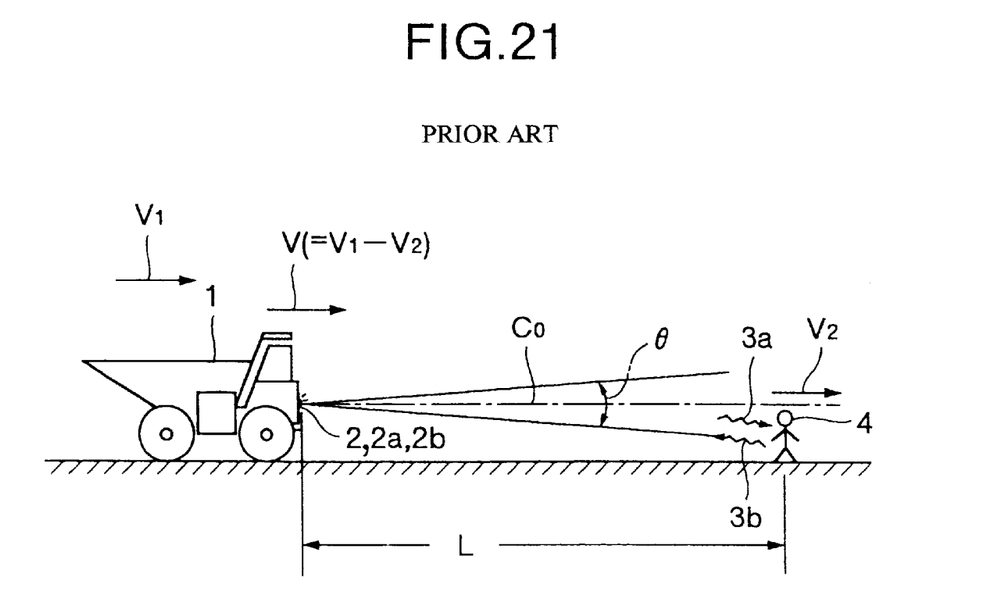
FIG. 21 is a side elevational view of a vehicle on which a conventional millimeter wave radar is mounted.

However, a millimeter wave radar has advantages as described hereinafter. The millimeter wave radar does not tend to be influenced by weather or dust, and is shorter in wavelength as compared with a microwave radar or the like, thereby reducing a transmitting/receiving antenna in size, and consequently the millimeter wave radar can be easily mounted on a vehicle. Specifically, as shown in FIG. 21, the antenna beam width θ can be narrowed, which reduces receipt of clutter from a road surface and surrounding objects. Moreover, relative velocity relative to objects can be detected with high precision by Doppler effect. Thus, there is an attempt wherein the millimeter radar is mounted on a high speed traveling vehicle. As shown in FIG. 21, a transmitted wave 3a is transmitted from a transmitting antenna 2a of a transmitting/receiving antenna 2 of the millimeter wave radar mounted on a vehicle 1, and a reflected wave 3b from an object 4 is received by a receiving antenna 2b. Thus, a distance L from the vehicle 1 to the object 4 and a relative velocity V between the vehicle 1 and the object 4 are detected.

As described above, the millimeter wave radar has advantages of being able to be reduced in size and not tending to be influenced by weather, thereby detecting objects with high precision, which can not be obtained by other detectors (the aforesaid ultrasonic sensor and the like). However, only an attempt to detect the distance L and the relative velocity V has been made, but no further attempt is made.

Incidentally, research on fleet running relative to a plurality of unmanned vehicles have been enthusiastically conducted in mines, quarries, and the like. Also in this case, the millimeter wave radar is considered to be effective in being mounted on these vehicles in view of the aforesaid advantages. However, a vehicle with a millimeter wave radar for operating in mines, quarries, and the like is strongly requested to detect meaning of information which an object to be detected has, for example, indication of traffic information such as a traffic sign and its meaning, other vehicles and their attitude, and the like altogether in addition to mere objective detection for avoiding collisions (that is, simple object detection), different from the aforesaid conventional vehicle with the millimeter wave radar traveling in expressways.

The millimeter wave radar, however, is basically a one-dimensional sensor (linear sensor) for detecting distance and relative velocity to an object. Therefore, no attempt to detect even such various indications is made.

DISCLOSURE OF THE INVENTION

The present invention is made to eliminate the aforesaid disadvantages of the prior art. An object of the present invention is to provide a vehicle with a millimeter wave radar by which not only a distance and a relative velocity to an object can be detected but also traffic information of various kinds or a variety of information which the object has or which is previously given to the object can be detected.

A first configuration of a vehicle on which a millimeter wave radar is mounted according to the present invention is a vehicle on which a millimeter wave radar which transmits a transmitted wave from a transmitting antenna of the millimeter wave radar mounted on the vehicle, receives a reflected wave from an object with a receiving antenna, and detects a distance and a relative velocity to the object is mounted, and characterized by including a reflector which is installed at a predetermined position near a road along which the vehicle is traveling and changes the reflection intensity of the reflected wave every predetermined period of time to indicate a road state near the predetermined position and traffic information with the change, a memory unit which is mounted on the vehicle and in which the change and an operation command of the vehicle based upon the change are stored beforehand, being made to correspond to each other, and a control unit which is mounted on the vehicle, reads the operation command corresponding to the detected change from the memory unit when the millimeter wave radar detects the change, and supplies the read operation command to a vehicle operating means of the vehicle to operate the vehicle.

According to the first configuration, by only indicating and changing the reflection intensity of one reflector, the millimeter wave radar and the control unit can variously, minutely and precisely detect not only a distance and a relative velocity to each reflector but also indications of a remote road state and the like, for example. Accordingly, in response to the detected indications, the control unit can allow the vehicle operating means to operate the vehicle so as to automatically avoid accidents or to automatically avoid collisions against objects, thereby greatly contributing to accomplishment of fleet traveling by plural unmanned vehicles.

A second configuration of a vehicle on which a millimeter wave radar is mounted according to the present invention is a vehicle on which a millimeter wave radar which transmits a transmitted wave from a transmitting antenna of the millimeter wave radar mounted on the vehicle, receives a reflected wave from an object with a receiving antenna, and detects a distance and a relative velocity to the object is mounted, and characterized by including a plurality of reflectors which are put into arrangement so that distances between adjacent reflectors are combination of distances not more than detection distance resolution of the millimeter wave radar and distances not less than the detection distance resolution in a predetermined range along a road along which the vehicle is traveling, to indicate the predetermined range and a road state thereabouts with the arrangement, a memory unit which is mounted on the vehicle and in which the arrangement and an operation command of the vehicle based upon the arrangement are stored beforehand, being made to correspond to each other, and a control unit which is mounted on the vehicle, reads the operation command corresponding to the detected arrangement from the memory unit when the millimeter wave radar detects the arrangement, and supplies the read operation command to a vehicle operating means of the vehicle to operate the vehicle.

According to the second configuration, by only indicating and arranging a small number of reflectors, the millimeter wave radar and the control unit can variously, minutely and precisely detect not only a distance and a relative velocity to each reflector but also indications of a remote road state and the like, for example. Accordingly, as in the aforesaid first configuration, in response to the detected indications, the control unit can allow the vehicle operating means to operate the vehicle so as to automatically avoid accidents or collisions against objects, thereby greatly contributing to accomplishment of fleet traveling by plural unmanned vehicles, for example.

A third configuration of a vehicle on which a millimeter wave radar is mounted according to the present invention is a first vehicle on which a millimeter wave radar which transmits a transmitted wave from a transmitting antenna of the millimeter wave radar mounted on the first vehicle, receives a reflected wave from an object with a receiving antenna, and detects a distance and a relative velocity to the object is mounted, and characterized by including a reflector which is installed at a predetermined position of a second vehicle and changes the reflection intensity of the reflected wave every predetermined period of time to indicate an operation state of the second vehicle with the change, a memory unit which is mounted on the first vehicle and in which the change and an operation command of the first vehicle based upon the change are stored beforehand, being made to correspond to each other, and a control unit which is mounted on the first vehicle, reads the operation command corresponding to the detected change from the memory unit when the millimeter wave radar detects the change, and supplies the read operation command to a vehicle operating means of the vehicle to operate the vehicle.

According to the third configuration, the first vehicle on which the millimeter radar wave is mounted can not only detect a distance and relative velocity to the detected second vehicle but also minutely detect various operations of the detected second vehicle, and can adopt the optimum operation in response to the detection and inform the vehicle of various operations of the first vehicle itself, thus not only preventing accidents by collisions but also contributing, to accomplishment of fleet traveling by plural unmanned vehicles in the open air.

A fourth configuration of a vehicle on which a millimeter wave radar is mounted according to the present invention is characterized in that the millimeter wave radar, which transmits a transmitted wave from a transmitting antenna of the millimeter wave radar mounted on the vehicle, receives a reflected wave from an object with a receiving antenna, and detects a distance and a relative velocity to the object, has a detection distance resolution which is variable.

According to the fourth configuration, the millimeter wave of which the detection distance resolution is variously changeable is provided, whereby not only a distance and a relative velocity to an object but also information of various kinds which the object possesses and which is previously given to the object can be detected.

BRIEF DESCRIPTION OF THE DRAWINGS

FIG. 19A, FIG. 19B, and FIG. 19C are FFT analytic diagrams for explaining the operational effects of the third and a fourth control examples of the fourth example of the present invention:

BEST MODE FOR CARRYING OUT THE INVENTION

Prior to the explanation of examples according to the present invention, an example of the specification of a millimeter wave radar which is mounted on a vehicle of the examples is described to facilitate understanding.

Figure 2:
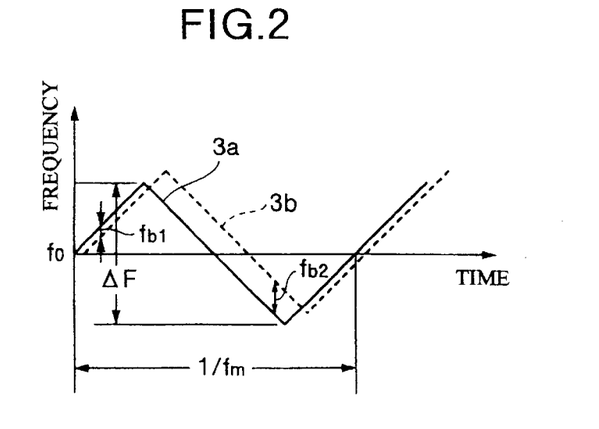
FIG. 2 is a diagram explaining an FM-CW method adopted in first, second, and third examples of the present invention.
Figure 11:
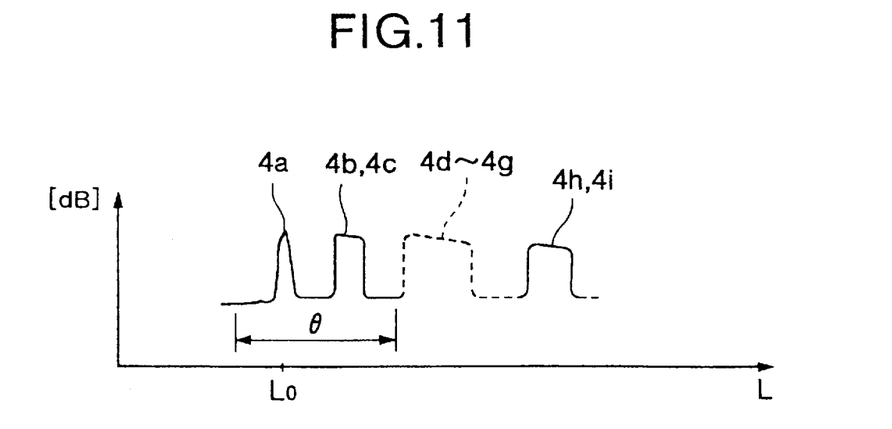
FIG. 11 is a characteristic diagram of received intensity in the second example of the present invention.

A millimeter wave is an electromagnetic wave with a wave length λ of 1 mm to 10 mm (300 GHz to 30 GHz). In the present examples, a frequency of 59.5 GHz ($\lambda \approx 5$ mm) is used. A pulse method, a two-frequency CW method, an FM-CW method and the like are known as signal processing methods in the millimeter wave radar. In the present examples, the FM-CW method is adopted as shown in FIG. 2, and moreover FFT (fast Fourier transformation) is adopted to discriminate a plurality of objects 4 as shown in FIG. 11. The details are as follows.

As shown in FIG. 2, in the FM-CW method, a millimeter wave is modulated with a modulated wave (a chopping wave in the examples), and a transmitted wave 3a transmitted from a transmitting antenna 2a and a reflected wave 3b received with a receiving antenna 2b are mixed by means of a mixer to obtain beat frequencies fb1 and fb2. Thereafter, a distance L and a relative velocity V between a vehicle 1 and an object 4 to be detected are computed with the following equations (1) and (2).

$$L = C \cdot (fb2 + fb1)/(8\Delta F \cdot fm) \quad (1)$$

$$V = C \cdot (fb2 - fb1)/(4fo) \quad (2)$$

Incidentally, C represents the velocity of light, fb1 represents "a beat frequency in an increase side" shown in FIG. 2, fb2 represents "a beat frequency in a decrease side" shown in FIG. 2, Δ F represents the deviation range of frequency (75 MHz in the examples), fm represents the frequency of the aforesaid modulated wave (781.25 kHz in the examples), and fo represents a center frequency which is the frequency of the aforesaid millimeter wave (59.5 GHz).

A width θ of an antenna beam described in the section of the aforesaid "Background Art" is shown in the following general equation (3).

$$\theta \approx 70 \cdot \lambda / D \quad (3)$$

Figure 3:
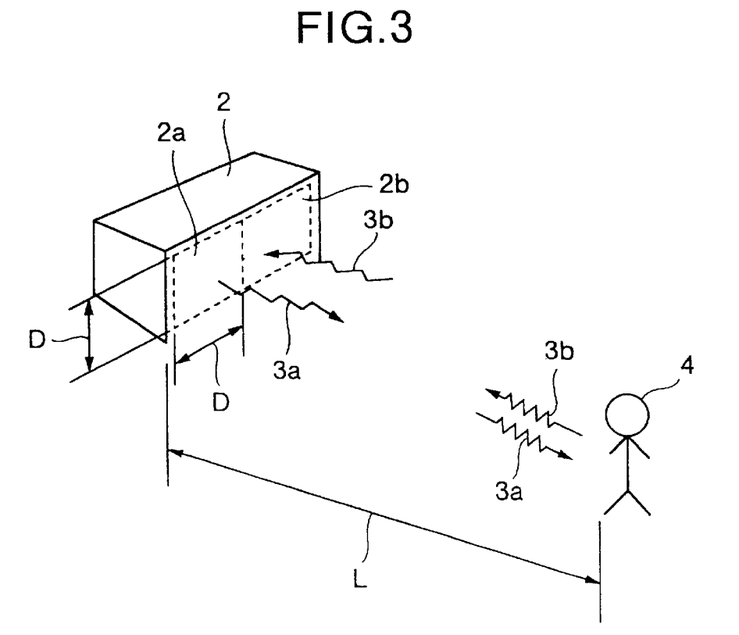
FIG. 3 is a perspective view of a transmitting/receiving antenna used in the first, second and third examples of the present invention.

In the above equation, D is the effective length of an antenna. The antenna beam width θ is an angle at which antenna gain is a half (½) of the antenna gain in the center Co of the antenna beam which is the maximum, thus showing the spread of effective wave in a wave radar. As shown in FIG. 3, in a transmitting/receiving antenna 2 in the examples, the transmitting antenna 2a and the receiving antenna 2b are disposed adjacent to each other, both the above antennas each having a flat surface with the antenna effective length D of about 85 mm each in length and in width. Therefore, the antenna beam width θ of the transmitting/receiving antenna 2 in the examples is obtained as $\theta \approx 4°$ (that is, 2° around the antenna beam center Co), since $\lambda \approx 5$ mm and D=85 mm are given in the above general equation (3).

Detection distance resolution Δ L relative to the object 4 to be detected by the wave radar is given by the following equation (4). Δ L=2 m is obtained in the present examples, and the position of the object is detected with the accuracy of ±1 m in front and behind.

$$\Delta L = C/2\Delta F \quad (4)$$

Incidentally, FIG. 2 is an explanatory view of one object. In order to concurrently detect a plurality of objects, however, the FFT is adopted in the examples as described above. Specifically, the received wave 3b (that is, the reflected wave 3b) has different received intensity [dB] depending on the distance L to an object, the direction of the object, and the effective reflection area of the object, and the like. The direction of the object corresponds to an angle formed between the antenna beam center Co (See FIG. 1 and FIG. 21) and the object which is seen from the transmitting/receiving antenna 2. Thus, in the FFT, paying attention to the aforesaid difference in received intensity [dB], a predetermined threshold value is set in received intensity [dB], and a beat frequency with received intensity [dB] larger than the threshold value is obtained. When a threshold value is set as described above, for example, each received intensity [dB] corresponding to each of the plurality of objects can be obtained as shown in FIG. 11. Namely, when one object to be detected exists, one pulse-like peak value can be obtained, and when a plurality of objects to be detected are placed in front of and behind one another, a plurality of pulse-like peak values are obtained. When an object has a continuous body such as an uphill slope, a continuous peak value is obtained with the continuous body regarded as a kind of gathering of plural objects.

Figure 1:
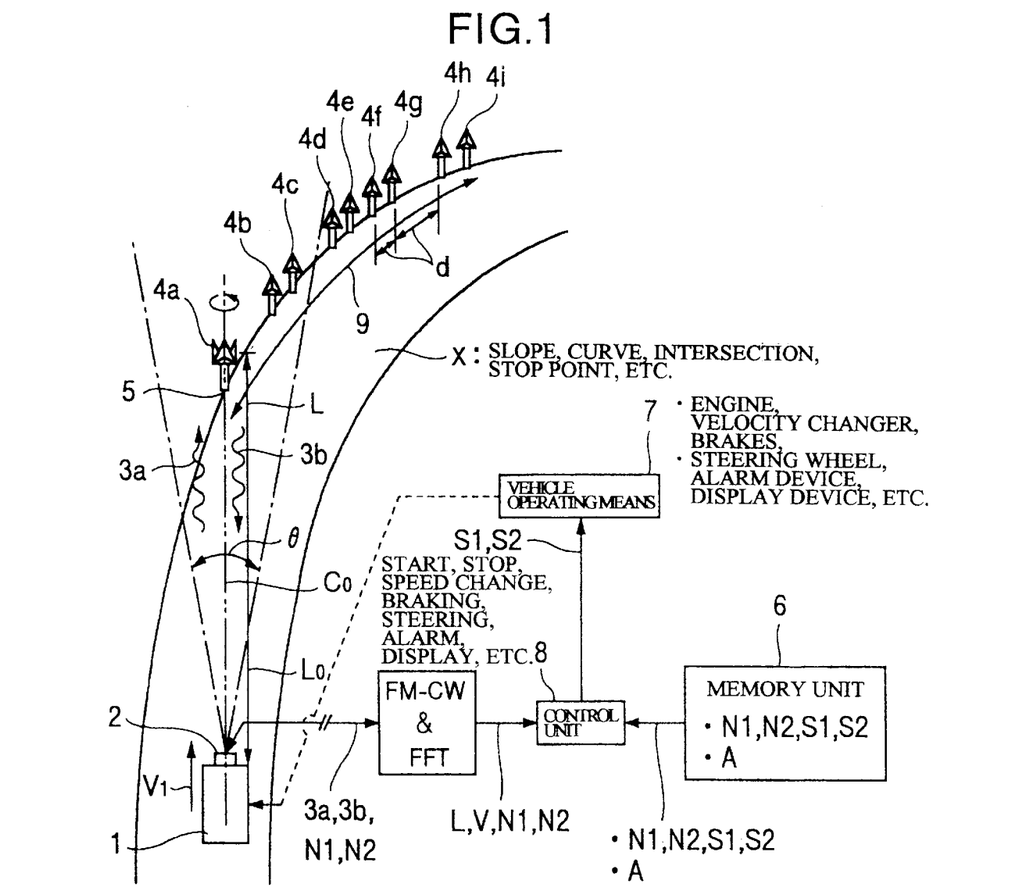
FIG. 1 is a schematic block diagram of first and second examples of the present invention.

Examples according to the present invention are described below in detail with reference to FIG. 1 and FIG. 4 to FIG. 14. As shown in FIG. 1, the vehicle 1 on which a millimeter wave radar of the aforesaid specification is mounted is equipped with the transmitting/receiving antenna 2 with the antenna beam center Co in a vertical and front direction relative to the front face of the vehicle 1 at a position of 1 m to 2 m from a ground surface. When the transmitting/receiving antenna 2 of the above specification is fixed as described above, the optimum performance of the maximum effective detection width of about 4 m to 4.5 m (thereby hardly receiving ground clutters) and the farthest effective detection distance of about 100 m as an object detecting radar for the vehicle 1 is shown, for example, due to mainly millimeter waves being absorbed into oxygen $O_2$ as described above.

While the vehicle 1 is traveling forwardly on a road before reaching a road state X (a curve X in the examples), for example, the millimeter wave radar can detect each distance L and each relative velocity V to each of a plurality of reflectors 4a to 4i which are provided in a predetermined position 5 (an edge 5 in the examples) of the curve X covering a predetermined range 9 of about 14 m in front of and behind the curve X. A reflector 4, that is, the reflectors 4a to 4i are fixedly installed objects, so that even if the distances L from the vehicle 1 to the respective reflectors 4a to 4i are different from one another, the relative velocities V to the vehicle 1 are the same.

Figure 4:
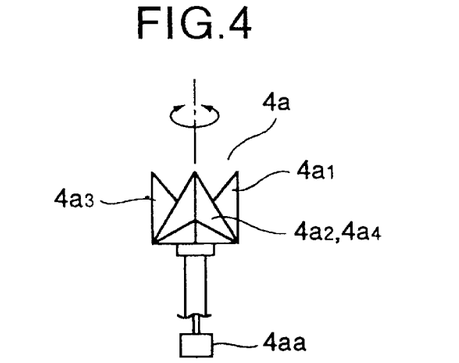
FIG. 4 is a front view of a polygonal reflector in the first example of the present invention.

The relationship between the reflector 4a which is a first example and the vehicle 1 is described with reference to FIG. 1 and FIG. 3 to FIG. 10. The reflector 4a is a polygonal reflector having four corner reflectors 4a1 to 4a4 which are shifted 90° from each other in a horizontal turn, for example, as shown in FIG. 4. The reflector 4a rotates at a constant speed, for example, of 600 rpm (cycle t=0.1 second) around a vertical shaft by means of a drive unit 4aa provided at the base thereof. Accordingly, if the vehicle 1 is traveling forwardly at 100 km per hour, the vehicle 1 travels about 2.8 m per the aforesaid cycle t.

Figure 5:
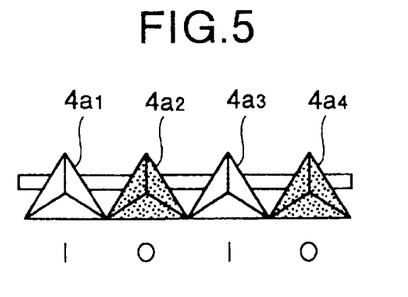
FIG. 5 is an expanded view of the polygonal reflector in FIG. 4.
Figure 6:
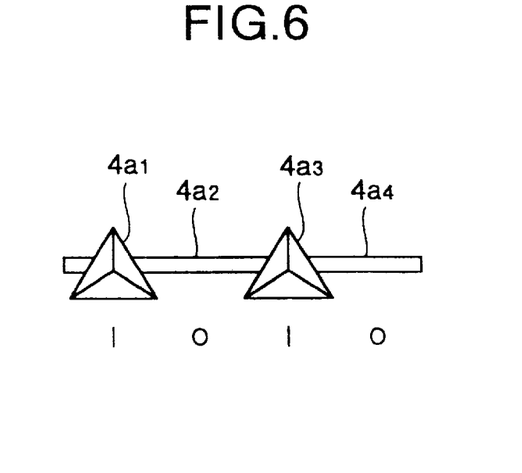
FIG. 6 is an expanded view of a polygonal reflector equivalent to the one in FIG. 5.
Figure 7:
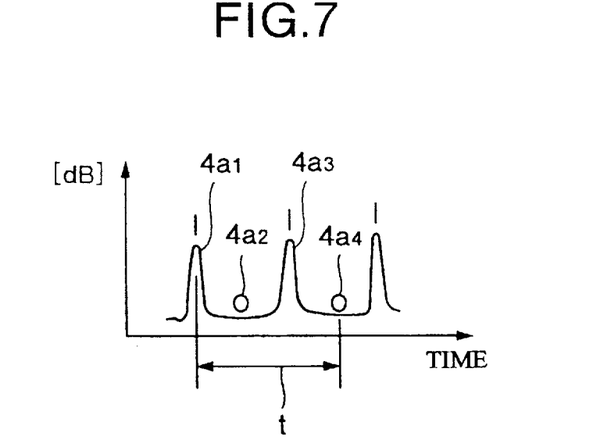
FIG. 7 is a characteristic diagram of received intensity from the polygonal reflectors in FIGS. 5 and 6.

Reflecting surfaces of the corner reflectors 4a2 and 4a4 are coated with a wave absorbing material (for example, a composite material in which ferrite is mixed with iron, brass, and the like) as shown in FIG. 5. Incidentally, as shown in FIG. 6, the corner reflectors 4a2 and 4a4 may be removed. When the aforesaid polygonal reflector 4a rotates, the millimeter wave radar can recognize the reflection intensity [dB] of the reflected wave 3b as "1, 0, 1, 0" per the cycle t as shown in FIG. 7. Specifically, installed in this example is the polygonal reflector 4a which indicates by change N1 of the aforesaid "•• , 1, 0, 1, 0, ••" that the road state X is "a curve", when the road state X is "a curve".

Meanwhile, as shown in FIG. 1, the vehicle 1 includes a memory unit 6 which previously stores the aforesaid change N1 "•• , 1, 0, 1, 0, ••" and an operation command S1 of the vehicle 1 based upon the change N1, both being made to correspond to each other. Naturally, the memory unit 6 stores not only the aforesaid "curve X" but also the change N1 of various kinds in which "1111", "1011", and the like show "a slope" and the others, for example, and the operation command S1 of the vehicle 1 based upon each change N1, being made to correspond to each other.

Further, the vehicle 1 includes a control unit 8. When the millimeter wave radar detects the aforesaid change N1, the control unit 8, in response to the change N1, reads the operation command S1 of the vehicle 1 corresponding to the change N1 from the memory unit 6 and supplies the read operation command S1 to a vehicle operating means 7 of the vehicle 1. The operation command S1 includes a start command and a stop command to an engine, a speed change command to a velocity changer, a braking command and a braking release command to brakes, a steering command to a steering wheel, an alarm command to an alarm device, various display commands to a display device and the like. The vehicle 1 is operated by the vehicle operating means 7 based on the operation command S1.

Specifically, the vehicle operating means 7 enables full automatic traveling if the vehicle 1 is an unmanned vehicle, and enables an alarm or a display to an operator and semi-automatic traveling if the vehicle 1 is a manned vehicle.

Incidentally, taking a possibility that the vehicle 1 is an unmanned vehicle into account, the memory unit 6 in this example stores not only the change N1 and the operation command S1 but also course data A and the like. Meanwhile, the control unit 8 inputs the distance L and the relative velocity V to the reflector 4a from the millimeter wave radar. For instance, after recognizing the existence of "the curve X" by the reflector 4a, the control unit 8 collates it with the course data A to further confirm "the curve X". The above confirmation is made, for example, to prevent a wrong operation from occurring by birds, falling rocks, and the like going across a space between the vehicle 1 and the reflector 4a. After the confirmation, the control unit 8 controls the timing or even the extent of supplying the operation command S1 to the vehicle operating means 7, for example, to what extent the vehicle is required to increase or decrease the relative velocity V when the distance L to the reflector 4a and the relative velocity V reach certain levels, thereby greatly contributing to full automation.

Figure 8:
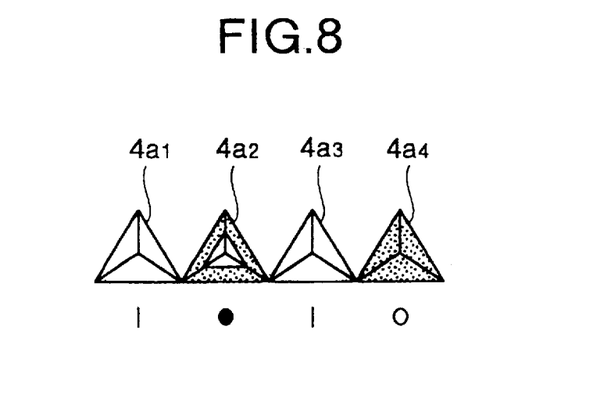
FIG. 8 is an expanded view of another polygonal reflector according to the first example of the present invention.
Figure 9:
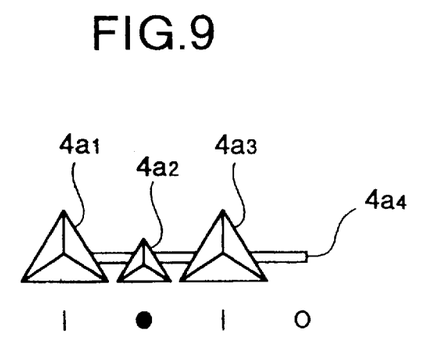
FIG. 9 is an expanded view of a polygonal reflector equivalent to the one in FIG. 8.
Figure 10:
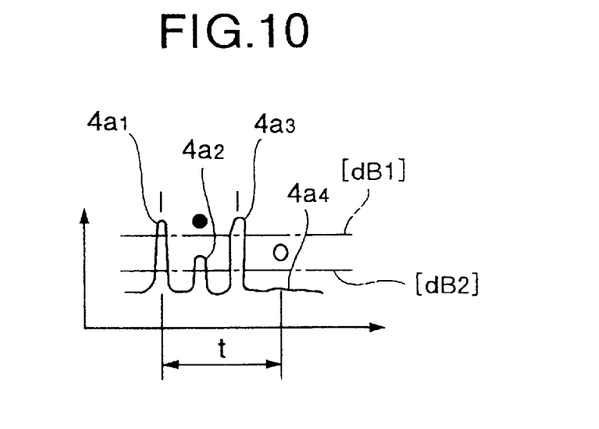
FIG. 10 is a characteristic diagram of received intensity from the polygonal reflectors in FIGS. 8 and 9.

Incidentally, in order to increase the number of the change N1 of the aforesaid reflector 4a, it is suitable to increase the number of surfaces of the reflector 4a, since the reflector 4a is a polygonal reflector. Alternatively, it is possible that as shown in FIG. 8, parts of the reflecting surfaces of the corner reflector 4a2 are covered with a wave absorbing material, (which is equivalent to a configuration in which a small-sized corner reflector 4a2 is attached as shown in FIG. 9), and as shown in FIG. 10, the generation sequence of "0", "●", and "1" is computed based on two threshold values [dB1] and [dB2] relative to reflection intensity [dB]. The above computation is performed in the control unit 8.

Furthermore, in order to obtain a larger number of the change N1 from the reflector 4a, a galvanometer scanner, for example, which can rotate to a universal angle and stop may be attached to the one reflector 4a, or a shutter which is rotated and stopped by the galvanometer scanner which can rotate to the universal angle and stop is attached to the front face of the reflector 4a. For instance, the cycle t is divided into twenty periods. The galvanometer scanner is rotated and stopped or shuttering is performed in such a manner that the reflector 4a faces the vehicle 1 in a combination of continuance and intermittence during the aforesaid divided period. Thus, while the reflector 4a faces the vehicle 1 or while the shutter is open, the receiving antenna 2b can receive the reflected wave 3b. Accordingly, supposing that some change N1 is the repetition of 20 digits of "00011001110101011101", many combinations (that is, indications of information) can be made, as is clear from the 20 digits. As the number of digits increases, information incorporated into the reflector 4a can increase. Incidentally, in this case, the rotation and stop of the galvanometer scanner is conducted by a controller provided separately. The road state X, traffic information, and the like at the aforesaid predetermined position 5 and at a position near or remote from the predetermined position 5 are inputted to the controller in appropriate timing by a sensor, a man, or the like. The controller rotates or stops the galvanometer scanner in response to the aforesaid input. In this case, information to be indicated can be increased as described above, and consequently information of the adhesion coefficient of a road surface, change in traveling resistance due to the direction of wind, and the like as well as the aforesaid road state X and traffic information can be given to the vehicle 1. Namely, the control unit 8 can supply more elaborate operation control to the vehicle operating means 7 to travel the vehicle, which greatly contributes to fleet traveling by a plurality of unmanned vehicles especially in the case of dump trucks traveling a fixed course in a mine and the like.

A conventional picture sensor can also give many indications as in the aforesaid first example, but has disadvantages of being influenced by weather (rain, fog, or snow) or by dust, and requiring complicate processing technology and the like as described above. Contrary to this, the above first example does not have such disadvantages but has an advantage that many indications can be realized by only providing the reflector 4a and somewhat modifying software of an existing vehicle with the millimeter wave radar.

The relationship between the reflectors 4a to 4i which are a second example and the vehicle 1 is described with reference to FIG. 1 and FIG. 11 to FIG. 13. The reflectors 4a to 4i are illustrated in FIG. 1. As shown in FIG. 1, the reflectors 4b and 4c are arranged along the curve X in such a manner that a distance d between them is not more than the detection distance resolution Δ L (1 m in this example). The reflectors 4d to 4g are also arranged at intervals of 1 m. The reflectors 4h and 4i are also arranged 1 m apart from each other. Meanwhile, the reflectors 4a and 4b are arranged so that the distance d between them is not less than the detection distance resolution Δ L (3 m in this example). The reflectors 4c and 4d are arranged 3 m apart from each other. The reflectors 4g and 4h are also arranged 3 m remotely from each other.

From the arrangement of the aforesaid reflectors 4a to 4i, the millimeter wave radar can analyze the reflected waves 3b from the respective reflectors 4a to 4i as shown in FIG. 11. Incidentally, in order to facilitate the explanation, the reflector 4a is a simple reflector similarly to the other reflectors 4b to 4i without having the change N1 described above. In FIG. 11, the vertical axis represents received intensity [dB], and the horizontal axis represents the distance L. As is obvious from FIG. 11, in the distance d between the adjacent reflectors 4 which is not more than the detection distance resolution Δ L, that is, the distance from 4b to 4c, 4d to 4g and 4h to 4i, continuous received intensity [dB] appears, which is completely the same as a bar code. A lot of road states X and traffic information can be indicated as in the above first example by putting the plurality of reflectors 4 of which the arrangement interval is alternately changed with the detection distance resolution Δ L as a standard into arrangement N2 of various kinds.

Figure 12:
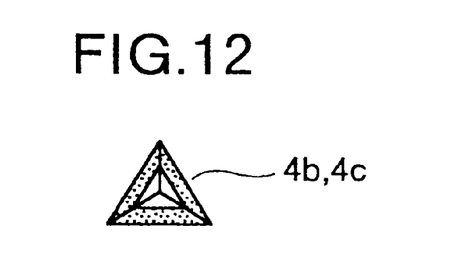
FIG. 12 is a front view of a reflector of which part of the reflecting surfaces are covered with a wave absorbing material according to the second example of the present invention.
Figure 13:
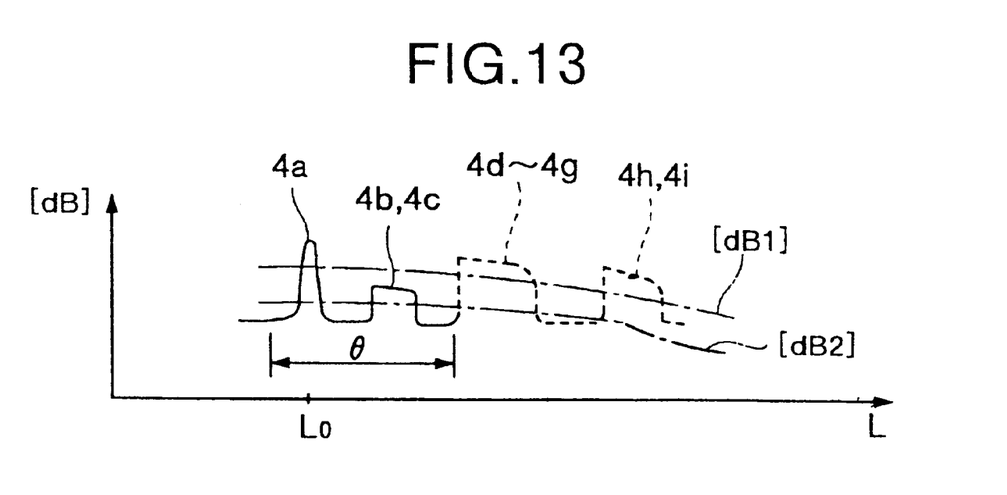
FIG. 13 is a characteristic diagram of received intensity from the reflector in FIG. 12.

Further, in order to increase the number of the arrangement N2 as information in the arrangement N2 of the aforesaid reflectors 4, for example, part of the reflecting surfaces of the reflectors 4b and 4c may be covered with a wave absorbing material as shown in FIG. 12, and two threshold values [dB1] and [dB2] may be provided to determine the presence or absence of "0", "●", and "1" as shown in FIG. 13. Incidentally, when the reflectors 4 are installed up to a remote place, the received intensity [dB] of the reflected wave 3a reduces in accordance with an increase in the distance L. Therefore, as shown in FIG. 13, the aforesaid threshold values [dB1] and [dB2] relative to reflection intensity [dB] from remote reflectors (for example, 4h and 4i) may be corrected based upon the distance L to the reflectors 4h and 4i detected by the millimeter wave radar. The storage, use, and correction of these two threshold values [dB1] and [dB2] are performed in the control unit 8 and the memory unit 6. It should be mentioned that the reflector 4a in the second example may be the reflector 4a in the aforesaid first example, and that the reflectors 4b to 4i may take the form of the reflector 4a in the aforesaid first example. Thus, information content to be indicated increases rapidly.

As shown in FIG. 1, the vehicle 1 in the second example includes the memory unit 6, the vehicle operating means 7, and the control unit 8 as in the aforesaid first example. In the second example, only the change N1 and the operation command S1 in the first example are changed to the arrangement N2 and an operation command S2 respectively, but respective functions are the same as each other, whereby the repeated explanation is omitted. The operation command S2 is an operation designating signal to the vehicle operating means 7, which is previously assigned correspondingly to the arrangement N2.

A system in the second example is associated with a bright spot follow-up system (a system in which traffic information is indicated in the arrangement of bright spots and the vehicle automatically travels while detecting the bright spots) in an automatic guided vehicle traveling system. In the bright spot follow-up system, however, unlike the second example neither the distance L nor the relative velocity V can be detected. Therefore, the correction of distance relative to the remote reflectors 4h to 4i can not be made. In addition, a configuration in which the detection distance resolution Δ L which is performance peculiar to the millimeter wave radar is utilized can not be thought of from the bright spot follow-up system. As described in the section of Background Art, a light detecting system as well as a laser radar, an infrared radar, and the like has a disadvantage of being influenced by weather (rain, fog, or snow) or by dust, thus not withstanding outdoor use. The second example overcomes all the above disadvantages.

Figure 14:
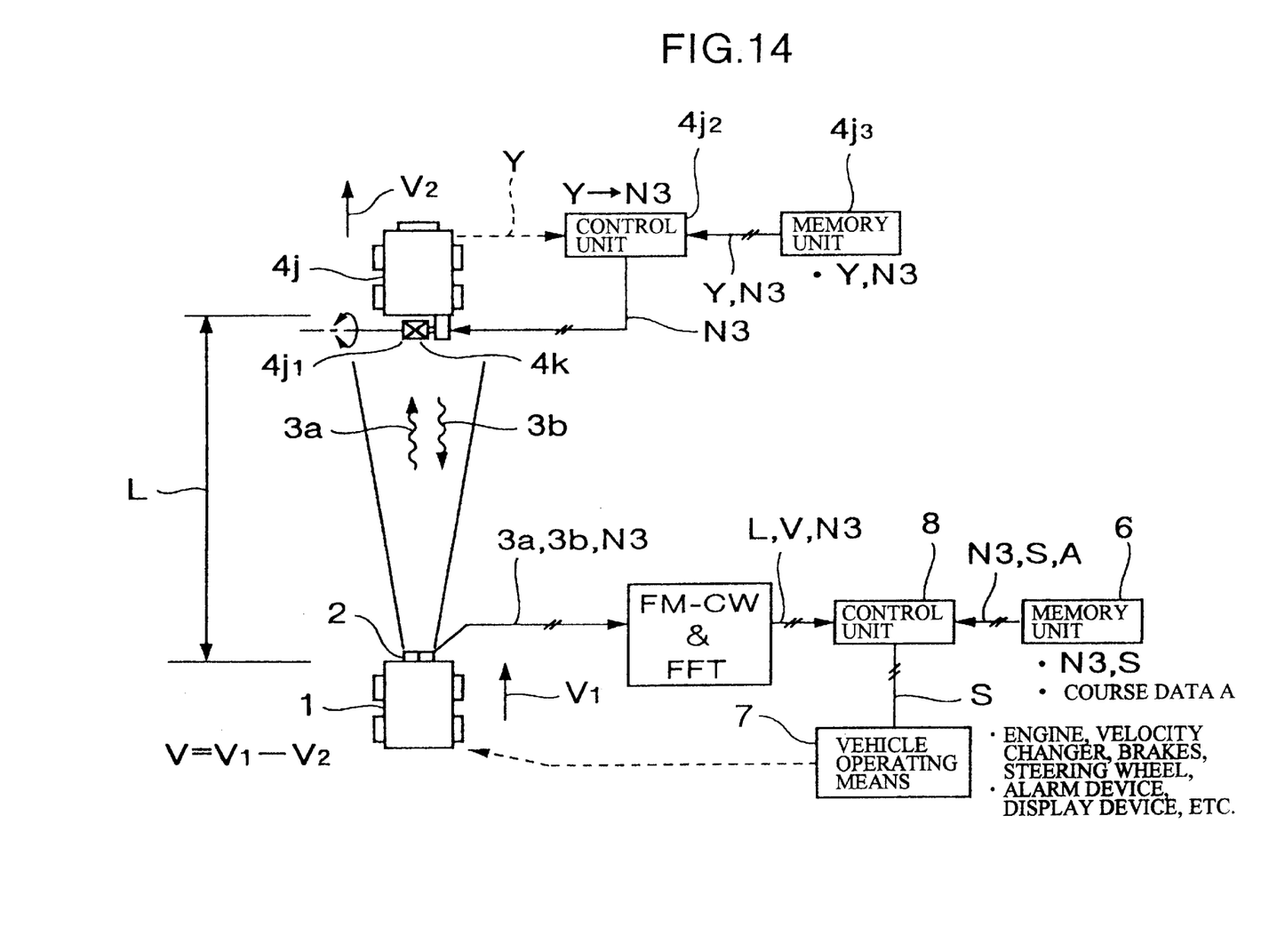
FIG. 14 is a schematic block diagram of the third example of the present invention.

A third example is described with reference to FIG. 14. The reflector 4a in the first example is mounted on another vehicle 4j. As shown in FIG. 14, a reflector 4k (which corresponds to the reflector 4a in the first example) is attached at a rear portion of the other vehicle 4j. The other vehicle 4j includes a memory unit 4i3 which previously stores various operation states Y (for example, braking, speed change, acceleration, deceleration, steering, danger alarm, and the like) and "change N3 of various kinds of the reflector 4k by the reflection intensity [dB] of the reflected wave 3b being changed in the cycle t" responsive to the various operation states Y. The other vehicle 4j further includes a control unit 4j2 which responsive to the current operation state Y, extracts the change N3 corresponding to the aforesaid current operation state Y from the aforesaid memory unit 4j3 and makes the reflector 4k change N3 based upon the change N3.

Meanwhile, as shown in FIG. 14, the vehicle 1 also includes the memory unit 6, the vehicle operating means 7, and the control unit 8 as in the first and second examples. Also in these units, only the change N1 and the operation command S1 in the first example are changed to the change N3 and an operation command S3 respectively, but respective functions are completely the same as those in the first example. The operation command S3 is an operation designating signal to the vehicle operating means 7, which is previously assigned correspondingly to the change N3.

According to the third example, the vehicle 1 not only can prevent collision with an object but can execute various optimum operations based on the operation of the other vehicle 4j, course data, the distance L and the relative velocity V to the detected vehicle, which are detected by the millimeter wave radar. In addition, the vehicle 1 can inform following vehicles of its own current operation state Y, thus preventing a rear-end collision. In order to utilize the reflector 4k in an intersection and the like, a place where the reflector 4k is attached may be provided on side surfaces, the front surface, the top surface, or the like of the vehicle 4j as well as the rear portion 4j1 thereof.

For the following vehicles, the vehicle 1 itself corresponds to the other vehicle 4j. Therefore, the vehicle 1 may have the same structure as the aforesaid other vehicle 4j. In other words, the vehicle 4j may have the same structure as the vehicle 1. In this case, the control unit 8 is included in a control unit 4j2, and the memory unit 6 is included in a memory unit 4j3.

According to the aforesaid example, the following effect is obtained. A vehicle on which the conventional millimeter wave radar is mounted can detect only the distance L and the relative velocity V to the object 4 to be detected. However, according to the aforesaid examples, the reflected wave 3b per unit hour is subjected to the change N1 by the reflector 4a, and the millimeter wave radar which can include the detection distance resolution Δ L of dozens of centimeters to several meters is provided, thereby enabling the detection of a lot of indicated information such as traffic information, attitude information of the vehicle, and the like.

Figure 15:
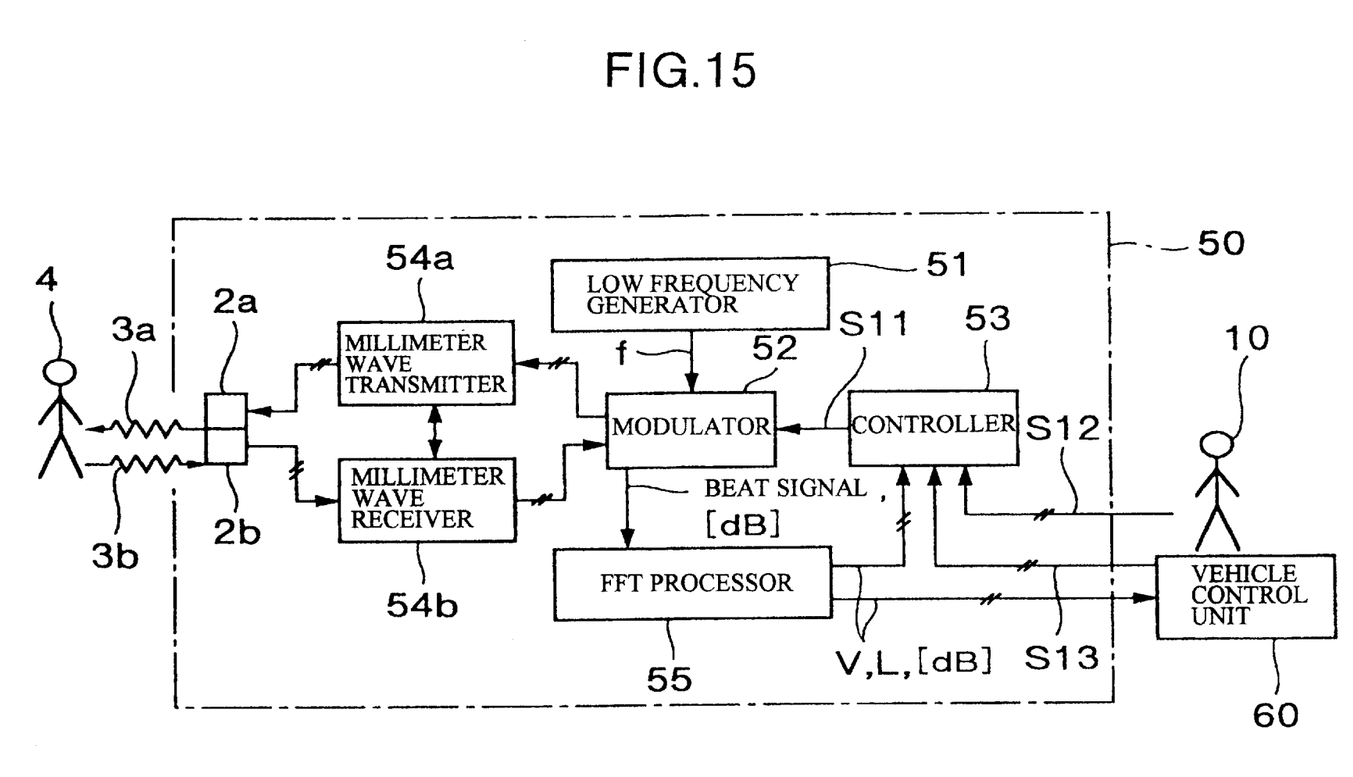
FIG. 15 is a block diagram of a fourth example of the present invention.
Figure 16:
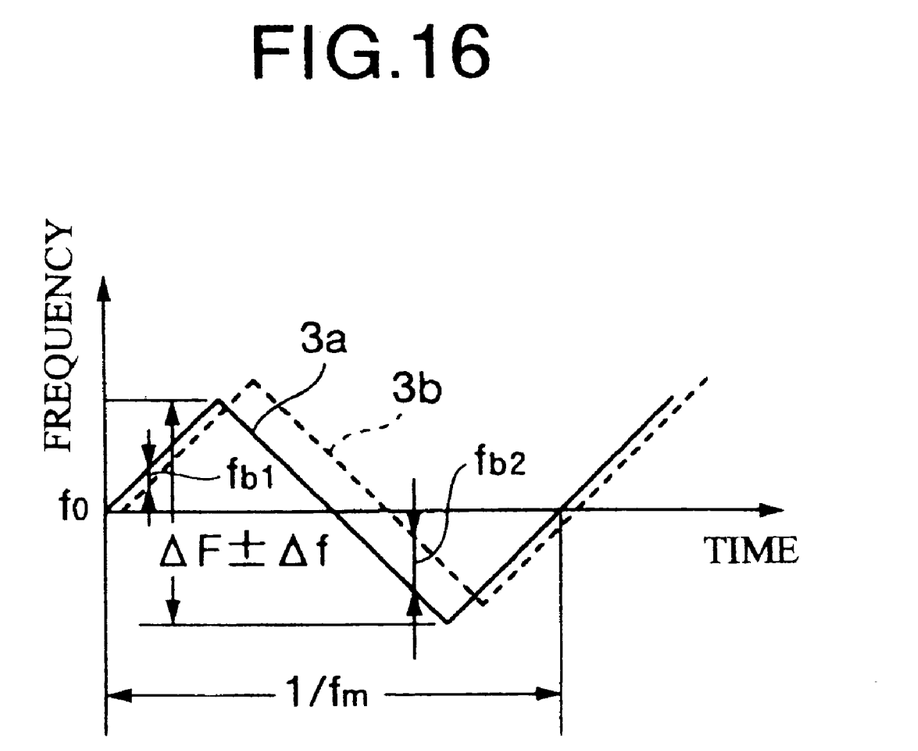
FIG. 16 is a diagram explaining an FM-CW method adopted in the fourth example of the present invention.

Prior to the explanation of a fourth example, an example of the specification of a millimeter wave radar which is mounted on a vehicle is described. A millimeter wave in use is the same as in the first example. In a millimeter wave radar 50 (See FIG. 15), the FM-CW method and the FFT are adopted as in the first example. Accordingly, similarly to the first example, the distance L and the relative velocity V between the vehicle 1 and the object 4 to be detected are computed by the aforesaid equations (1) and (2). Incidentally, frequency deviation range Δ F of the millimeter wave radar 50 is 75 MHz in this example, but increase or decrease of ±Δ F is possible as shown in FIG. 16. The other frequency characteristics are the same as in the first example.

Figure 19A:
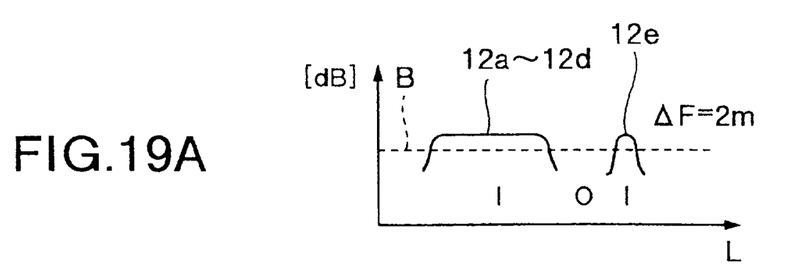
FIG. 19A shows a case where detection distance resolution is in a lower range.
Figure 19B:
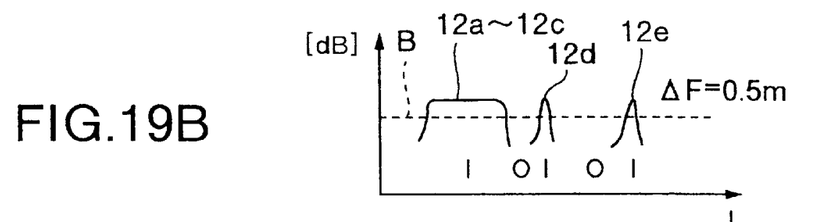
FIG. 19B shows a case where it is medium.
Figure 19C:
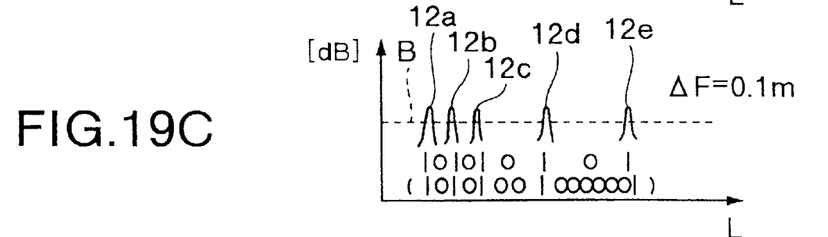
FIG. 19C shows a case where it is in a higher range.

FIG. 16 is an explanatory diagram in the case where the object 4 is only one. In the FFT for detecting the plurality of objects 4, however, received intensity [dB] of received waves is different depending on the distances L to the objects 4, the directions to the objects 4 (an angle formed between the antenna beam center Co and the objects 4 which are seen from the transmitting/receiving antenna 2), the effective reflection areas of the objects 4, and the like.. Thus, paying attention to the aforesaid difference, as shown in FIG. 19, a predetermined threshold value B is set in received intensity [dB], and beat frequencies with received intensity [dB] larger than the threshold value B are obtained. When the threshold vale B is set as described above, received intensity [dB] corresponding to the number of the objects 4 can be obtained. Namely, if the object 4 is single, one peak value (for example, 12e in FIG. 19A) is obtained. If the objects 4 are more than one, plural peak values (for example, 12a, 12b, 12c, 12d, and 12e in FIG. 19C) are obtained. If the object has a continuous body such as a climbing road surface in front, a continuous peak value (for example, 12a to 12d in FIG. 19A) is obtained.

Figure 17:
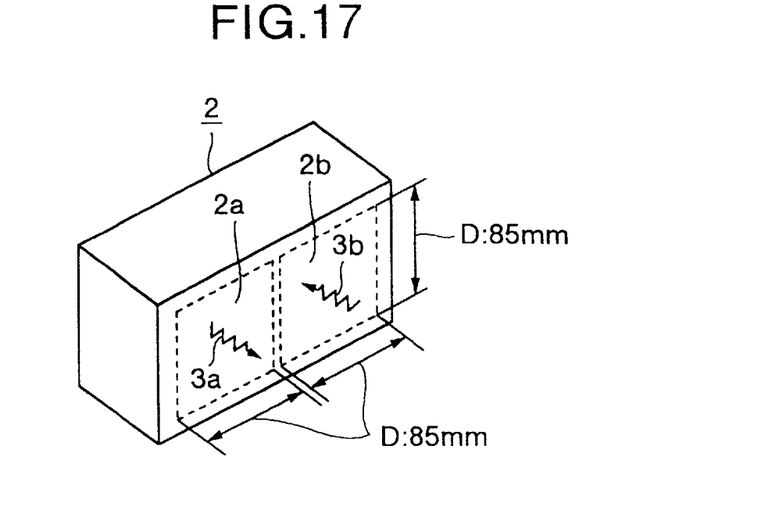
FIG. 17 is a perspective view of a transmitting/receiving antenna in the fourth example of the present invention.

The transmitting/receiving antenna 2 in the present example is similar to that in the first example. As shown in FIG. 17, the transmitting antenna 2a and the receiving antenna 2b are disposed adjacent to each other, both the above antennas each having a flat surface with the antenna effective length D of about 85 mm each in length and in width. Therefore, the antenna beam width θ of the transmitting/receiving antenna 2 in the present example is obtained as θ≈4°, that is, 2° around the antenna beam center Co. Detection distance resolution Δ L relative to the object 4 to be detected by the wave radar is given by the aforesaid equation (4), and Δ L=2 m (that is, the accuracy of ±1 m in front and behind) is obtained also in the present example. In the present example, the Δ L is free to change although the details thereof are described later.

The fourth example is described with reference to FIG. 15. The millimeter wave radar 50 in the present example can be described with the concept of FIG. 15. A low frequency f is generated by means of a low frequency generator 51, and the low frequency f is inputted to an FM modulator 52. The modulator 52 increases or decreases by ±Δ fm a frequency fm of the low frequency f based on a command signal S11 from a controller 53 and at the same time increases or decreases by ±Δ f the frequency deviation range Δ F. It is possible that the aforesaid increase or decrease is conducted by a plurality of modulation units being provided and switched. However, the increase or decrease is conducted in such a manner that an integrated value "fm·Δ F" of the above two does not change before and after the increase or decrease. The modulated millimeter wave is transmitted as the transmitted wave 3a from the transmitting antenna 2a via a millimeter wave transmitter 54a. The reflected wave 3b (that is, the received wave 3b) from the object 4, together with the received intensity [dB] thereof, is received by the receiving antenna 2b, and inputted to the modulator 52 via a millimeter wave receiver 54b. The modulator 52 computes the beat frequencies fb1 and fb2, and inputs these beat frequencies fb1 and fb2 with the received intensity [dB] thereof to an FFT processor 55. The FFT processor 55 computes the distance L and the relative velocity V to each of the objects 4 to be detected respectively based on each received intensity [dB], and inputs the result thereof to the controller 53 and a vehicle control unit 60. The vehicle control unit 60 is, for example, an alarm device, a display device, or the like if the vehicle 1 is a manned vehicle. Meanwhile, if the vehicle 1 is an unmanned vehicle, the vehicle control unit 60 is, for example, an engine control system, a steering system, a braking system, speed change system, or the like. Moreover, the controller 53 is structured to receive a command signal S12 directly from a driver 10 as well as the distance L and the relative velocity V from the FFT processor 55. The controller 53 inputs the increased or decreased modulated wave ±Δ fm and the increased or decreased frequency deviation range ±Δ f as a command signal 11 to the modulator 52.

According to the above equation (4), the detection distance resolution Δ L is inversely proportional to the frequency deviation range Δ F. Meanwhile, according to the equation (1), the frequency deviation range Δ F is in inverse proportion to the frequency fm. Namely, the detection distance resolution Δ L is proportional to the frequency fm. However, as is obvious from the above equation (1), it is required that the increase or decrease is conducted in such a manner that an integrated value "fm·Δ F" of the above two does not change before and after the increase or decrease.

If both the frequency fm and the frequency deviation range Δ F are changed, the detection distance resolution Δ L changes. For instance, in order to change Δ L=2 m in the present example to Δ L=0.2 m (that is, in order to raise the detection distance resolution Δ L), fm=781.25 Hz in the present example is changed to 78.125 Hz and Δ F=75 MHz is changed to Δ F=750 MHz.

Specifically, the vehicle on which the millimeter radar is mounted in the aforesaid fourth example has the millimeter wave radar 50 in which the detection distance resolution Δ L is variable. Thus, the following effect, that is, the effect that the controller 53 includes the following various controls and can determine the content of the signal S11 can be obtained.

(1) A first control example is described. For example, the detection distance resolution Δ L is made larger relative to the remote (L=large) object 4 to be detected. In this situation, even if actually there exist a plurality of objects 4, the objects 4 are detected only as a single object 4 (or an uphill slope, for instance). Accordingly, a plurality of distances L and relative velocities V which confuse the vehicle control unit 60 do not need to be inputted to the vehicle control unit 60, thereby facilitating FFT processing and processing in the vehicle control unit 60. Meanwhile, when a dump truck is loaded with earth and sand by a wheel loader, for example, the wheel loader needs to approach the dump truck, for example, to about 10 cm from the dump truck. In this situation, it is apparently required that the detection distance resolution Δ L is made smaller to avoid any collision. Specifically, the controller 53 is structured to store various programs in the aforesaid situations. Besides, as shown in FIG. 15, an operation signal S13 of the vehicle 1 is fed back from the vehicle control unit 60, and the controller 53 determines the optimum command signal S11 based on the aforesaid programs by the operation signal S13 and inputs it to the modulator 52.

(2) A second control example is described. The beat frequencies fb2 and fb1 need to be computed at least every cycle 1/fm as shown in FIG. 16. Namely, if the relative velocity V becomes higher, there occurs a case where the vehicle 1 travels a distance exceeding the detection distance resolution Δ L between the present detection and the next detection. Therefore, there are some cases where the meaning of raising the detection distance resolution Δ L (that is, the meaning of making the value of the detection distance resolution Δ L smaller) disappears. Specifically, the initial detection distance resolution Δ L of the vehicle 1 in the present example is Δ≈2 m. Supposing that the relative velocity V relative to the object 4 in the vehicle 1 is 100 km/h, a reduction in the distance L between the vehicle 1 and the object 4 during a period until the next detection in the initial fm=781.25 Hz is about 3.8 cm. If fm is, however, changed to fm=78.125 Hz by the controller 53, Δ L=2 m is changed to Δ L=0.2 m as described above, but a reduction (or extension) in the distance L between the vehicle 1 and the object 4 during a period until the next detection becomes as large as about 38 cm. In other words, the reduction of about 38 cm is more than the detection distance resolution Δ L of 0.2 m, thereby causing the case where the meaning of raising the detection distance resolution Δ L disappears. Thus, even in high speed traveling, when the distance L is sufficiently large, the detection distance resolution Δ L is given priority over reduction. Meanwhile, when the distance L is shorter, the operation in which reduction is given priority over the detection distance resolution Δ L is performed. In view of the above, the controller 53 is structured to receive the command signal S12 directly from the driver 10 as well as the distance L and the relative velocity V from the FFT processor 55. It goes without saying that the command signal S12 direct from the driver 10 is an interrupt signal which can freely select or stop the aforesaid programs.

Figure 18:
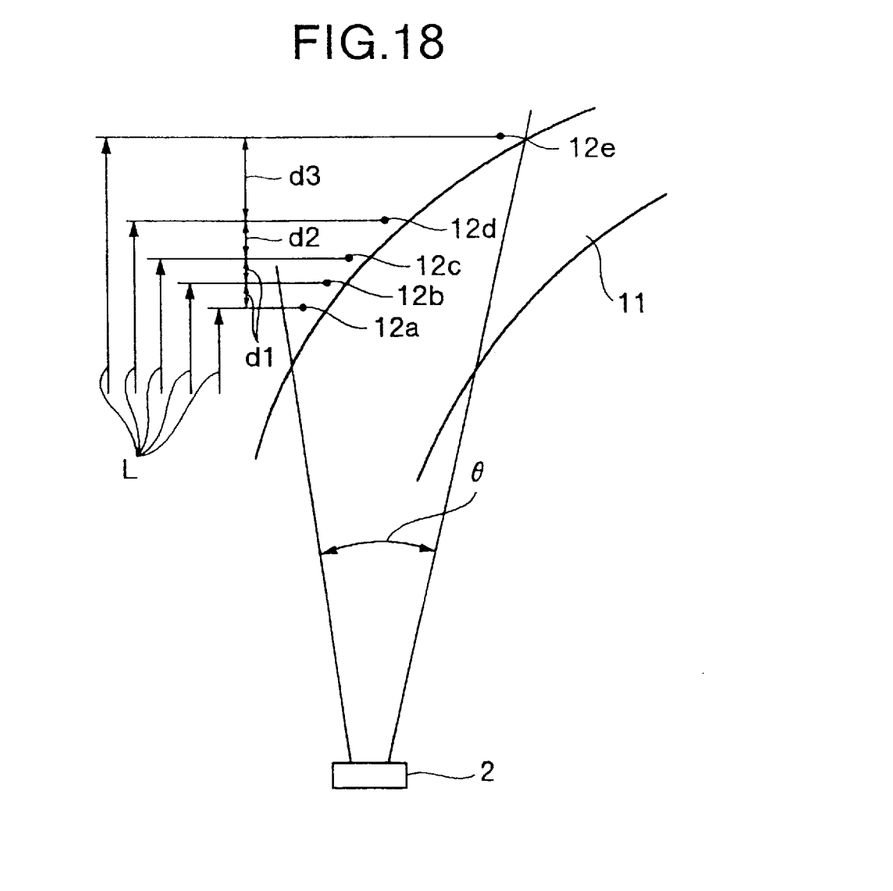
FIG. 18 is an arrangement view of reflectors provided in a curve for explaining a third control example of the fourth example of the present invention.

(3) A third control example is described. As shown in FIG. 18, for example, five reflectors (12a to 12e) with a distance d between adjacent reflectors being changed to d1, d2, and d3 are provided along a curve of a traveling road 11. Each distance d1 between the reflectors 12a and 12b and between the reflectors 12b and 12c is set at 20 cm. A distance d2 between the reflectors 12c and 12d is set at 40 cm. A distance d3 between the reflectors 12d and 12e is set at 150 cm. Meanwhile, the controller 53 includes the command signal S11 for changing the detection distance resolution Δ L into three levels of 2 m, 50 cm, and 10 cm. This change may be carried out periodically, or may be carried out periodically for a while only when the vehicle travels a travel distance which is previously obtained from the course data. First, when the reflectors 12a to 12e are detected with Δ L=2 m, as shown in FIG. 19A, the reflectors 12a to 12e are detected as a continuous single object by the received intensity [dB] and its threshold value B and by Δ L=2 m, thus enabling a signal of binarization of "101". Then, when Δ L is switched to Δ L=50 cm, as shown in FIG. 19B, the aforesaid reflectors 12a to 12d are detected, being divided into the reflectors 12a to 12c and the reflector 12d, thus enabling a signal of binarization of "10101". Further, when switched to Δ L=10 cm, as shown in FIG. 19C, all the reflectors 12a to 12e are individually detected, thus enabling detection with a signal of binarization of "1010101". Namely, innumerable information (traffic information and the like) can be obtained from a series of changes in combination of arrangement of the reflectors 12a to 12e and switching of the detection distance resolution Δ L. Consequently, many indications can be made beforehand by arrangement of the reflectors 12a to 12e, and moreover these reflectors with the indications thereof can be detected. Incidentally, although the indication of "a curve" is main in this example, the number of binary-coded digits reaches a total of as many as fifteen digits, whereby together with the indication of "a curve", even the curvature of the curve, length of the curve, necessity for the vehicle 1 to brake at the curve, the degree thereof, and the like can be indicated all at once. If the distance d between the reflectors which is about double the detection distance resolution Δ L is binary-coded as one unit, the millimeter wave radar 50 can compute the distance among the respective reflectors 12. Therefore, when switched to Δ L=10 cm, as shown with binary-coded digits in a lower column of FIG. 19C, "1010010000001" can be read. Thus, innumerable indications and the detection thereof can be further executed.

Figure 20:
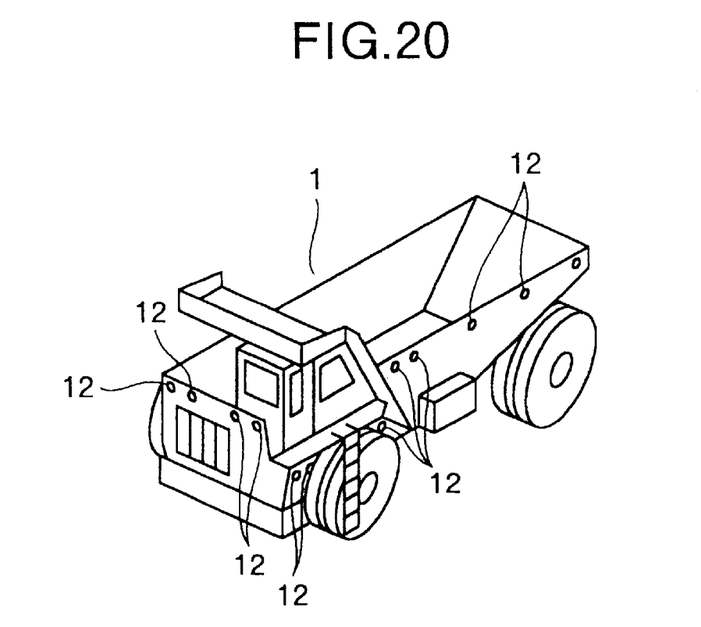
FIG. 20 is a perspective view of a dump truck for explaining the fourth control example of the fourth example of the present invention.

(4) A fourth control example is described. As shown in FIG. 20, for example, similarly to the aforesaid (3), a plurality of reflectors 12 are previously mounted respectively on the front, rear, left, and right surfaces of the vehicle 1 with the distance d among them which is different from one another as indications of being the said surfaces (the front surface, rear surface, left surface, right surface, and the like of the vehicle 1). The controller 53 stores the indications in advance. When such vehicles 1 enter an intersection and face each other, for instance, each of both the vehicles 1 detects the plurality of reflectors 12 on the front surface of the other vehicle 1 as one reflector, since both the vehicles 1 face each other at first. The reason why the reflectors 12 are detected as one reflector is that when seen from one vehicle 1, the distances L to the plurality of reflectors 12 on the front surface of the other vehicle 1 are the same. If the other vehicle 1 takes a turn to the right, however, the reflectors 12 on the front surface of the other vehicle 1 can be detected as plural reflectors and the plural reflectors 12 on the left side surface can be also detected gradually. At this time, the vehicle on this side can recognize the left surface of the other vehicle 1 by changing the detection distance resolution Δ L as described in the aforesaid (3), and can detect that the other vehicle 1 takes a turn to the right through the above recognition. Hence, the vehicle operation unit 60 of the vehicle 1 can execute evacuating operation such as prevention of collision against the other vehicle 1.

In other words, a vehicle on which a conventional millimeter wave radar is mounted detects only the distance L and the relative velocity V to the object 4 to be detected. According to the fourth example, however, the millimeter wave radar 50 which can variously change the detection distance resolution Δ L is provided, thereby detecting even a variety of information such as traffic information, attitude information of the vehicle, and the like.

Each of the aforesaid examples is not limited to a millimeter wave, but is theoretically applicable to a microwave and the like, and an electric wave with wavelength more than the microwave. As described above, however, the millimeter wave is advantageous when being mounted on the vehicle 1 in that an antenna can be decreased in size as compared with other wavelengths. Further, the millimeter wave has a characteristic that absorption into oxygen $O_2$ is extremely marked as compared with other wavelengths. According to this characteristic, the millimeter wave is steadily attenuated with an increase in distance, and as a result the optimum object detection distance (up to about 120 m) in the vehicle 1 can be secured. Meanwhile, in other wavelengths, there scarcely exists absorption into oxygen $O_2$ as compared with the millimeter wave so that even exceedingly remote objects are detected. Therefore, radar with other wavelengths detects even remote objects which are completely unnecessary for a vehicle, thereby causing noise, and thus is unsuitable for radar on vehicle. The aforesaid examples are made under these backgrounds, and practicable especially in the millimeter wave which detects a short distance without detecting a long distance.

Industrial Availability

The present invention is useful as a vehicle with a millimeter wave radar by which not only a distance and a relative velocity to an object can be detected but also traffic information of various kinds or a variety of information which the object has or which is previously given to the object can be detected.

What is claimed is:
1. A vehicle on which a millimeter wave radar which transmits a transmitted wave from a transmitting antenna of the millimeter wave radar mounted on the vehicle, receives a reflected wave from an object with a receiving antenna, and detects a distance and a relative velocity to the object is mounted, said vehicle on which a millimeter wave radar is mounted, comprising:

- a reflector which is installed at a predetermined position near a road along which the vehicle is traveling and changes the reflection intensity of the reflected wave every predetermined period of time to indicate a road state near the predetermined position and traffic information with the change;
- a memory unit which is mounted on the vehicle and in which the change and an operation command of the vehicle based upon the change are stored beforehand, being made to correspond to each other; and
- a control unit which is mounted on the vehicle, reads the operation command corresponding to the detected change from said memory unit when the millimeter wave radar detects the change, and supplies the read operation command to a vehicle operating means of the vehicle to operate the vehicle.

2. A vehicle on which a millimeter wave radar which transmits a transmitted wave from a transmitting antenna of the millimeter wave radar mounted on the vehicle, receives a reflected wave from an object with a receiving antenna, and detects a distance and a relative velocity to the object is mounted, said vehicle on which a millimeter wave radar is mounted, comprising:

- a plurality of reflectors which are put into arrangement so that distances between adjacent reflectors are combination of distances not more than detection distance resolution ($\Delta L$) of the millimeter wave radar and distances not less than the detection distance resolution ($\Delta L$) in a predetermined range along a road along which the vehicle is traveling, to indicate a road state in and around the predetermined range with the arrangement;
- a memory unit which is mounted on the vehicle and in which the arrangement and an operation command of the vehicle based upon the arrangement are stored beforehand, being made to correspond to each other; and
- a control unit which is mounted on the vehicle, reads the operation command corresponding to the detected arrangement from said memory unit when the millimeter wave radar detects the arrangement, and supplies the read operation command to a vehicle operating means of the vehicle to operate the vehicle.

3. A vehicle on which a millimeter wave radar which transmits a transmitted wave from a transmitting antenna of the millimeter wave radar mounted on the vehicle, receives a reflected wave from an object with a receiving antenna, and detects a distance and a relative velocity to the object is mounted, said vehicle on which a millimeter wave radar is mounted, comprising:

- a reflector which is installed at a predetermined position of another vehicle and changes the reflection intensity of the reflected wave every predetermined period of time to indicate an operation state of the other vehicle with the change;
- a memory unit which is mounted on the vehicle and in which the change and an operation command of the vehicle based upon the change are stored beforehand, being made to correspond to each other; and
- a control unit which is mounted on the vehicle, reads the operation command corresponding to the detected change from said memory unit when the millimeter wave radar detects the change, and supplies the read operation command to a vehicle operating means of the vehicle to operate the vehicle.

4. A vehicle on which a millimeter wave radar which transmits a transmitted wave from a transmitting antenna of the millimeter wave radar mounted on the vehicle, receives a reflected wave from an object with a receiving antenna, and detects a distance and a relative velocity to the object is mounted, said vehicle on which a millimeter wave radar is mounted, comprising:

- a controller which is mounted on the vehicle and changes detection distance resolution ($\Delta L$) of the millimeter wave radar which is set at a plurality of levels by switching the levels;
- a plurality of reflectors which are installed at predetermined positions near a road along which the vehicle is traveling and transmit the reflected wave to which road states near the predetermined positions and traffic information are indicated at each of the plurality of levels of detection distance resolution ($\Delta L$); and
- a vehicle control unit which operates the vehicle based upon the indicated reflected wave received by the receiving antenna.

5. The vehicle on which the millimeter wave radar is mounted in accordance with claim 4, wherein said controller sets a predetermined threshold value relative to the received intensity of the indicated reflected wave received by the receiving antenna and makes the indicated reflected wave an indicated binary-coded signal.

* * * * *